US00RE47280E

(19) United States
(12) Reissued Patent
Li et al.

(10) Patent Number: US RE47,280 E
(45) Date of Reissued Patent: Mar. 12, 2019

(54) STAPLE GUN

(71) Applicant: Isaberg Rapid AB, Hestra (SE)

(72) Inventors: Jiajia Li, Shanghai (CN); Yunlong Jiang, Weifang (CN)

(73) Assignee: Isaberg Rapid AB, Hestra (SE)

(21) Appl. No.: 29/610,348

(22) Filed: Jul. 11, 2017

Related U.S. Patent Documents

Reissue of:
(64) Patent No.: Des. 768,449
Issued: Oct. 11, 2016
Appl. No.: 29/494,093
Filed: Jun. 17, 2014

(30) Foreign Application Priority Data

Dec. 17, 2013 (EM) ..... 002371187-0001

(51) LOC (11) Cl. ..... 19-02
(52) U.S. Cl.
USPC ..... D8/49
(58) Field of Classification Search
USPC ..... D8/48, 49, 50, 61, 68, 69, 70; D19/65, D19/69, 73; D21/532; D24/145
CPC ..... B25C 5/0242; B25C 5/0285; B25C 5/11; B27F 5/17; B26F 1/36
See application file for complete search history.

(56) References Cited

U.S. PATENT DOCUMENTS

D517,385 S * 3/2006 Arns ..... D8/49
D518,695 S * 4/2006 Hu ..... D8/49
D531,469 S * 11/2006 Osberg ..... D8/49
D553,459 S * 10/2007 Shor ..... D8/49
D553,460 S * 10/2007 Shor ..... D8/49
D568,129 S * 5/2008 Arns ..... D8/49
D568,130 S * 5/2008 Arns ..... D8/49
D604,576 S * 11/2009 Betsalel ..... D8/49
D620,330 S * 7/2010 Krumpe ..... D8/49
D620,331 S * 7/2010 Krumpe ..... D8/49
D630,073 S * 1/2011 Krumpe ..... D8/49
D655,587 S * 3/2012 Walters ..... D8/49
D655,588 S * 3/2012 Pennington ..... D8/49
D667,712 S * 9/2012 Walters ..... D8/49
D668,125 S * 10/2012 Pennington ..... D8/49
D689,753 S * 9/2013 Yoo ..... D8/49
D723,894 S * 3/2015 Genord ..... D8/49
D727,125 S * 4/2015 Genord ..... D8/49

* cited by examiner

*Primary Examiner* — Philip S Hyder
(74) *Attorney, Agent, or Firm* — Shapiro, Gabor and Rosenberger, PLLC

(57) CLAIM

The ornamental design for a staple gun, as shown and described.

DESCRIPTION

FIG. 1 is a front, left-side perspective view of a staple gun showing the new design;
FIG. 2 is a right side view thereof;
FIG. 3 is a rear view thereof;
FIG. 4 is a left side view thereof;
FIG. 5 is a front view thereof;
FIG. 6 is a top view thereof; and,
FIG. 7 is a bottom view thereof.
The broken line showing in FIGS. 1, 2, 3, 4 and 7 is for the purpose of illustration and forms no part of the claimed design.

1 Claim, 7 Drawing Sheets

Figure 3:
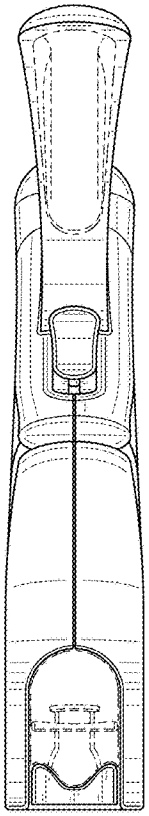
Figure 5:
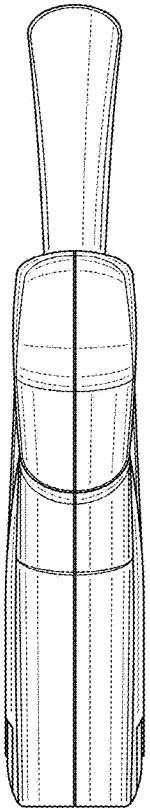
Figure 6:
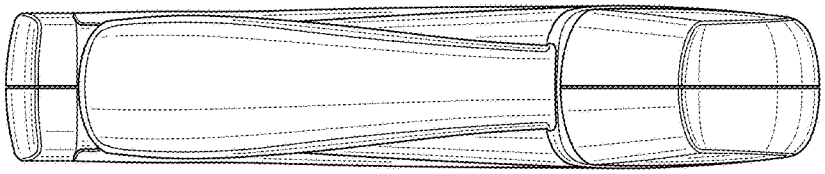
Figure 7:
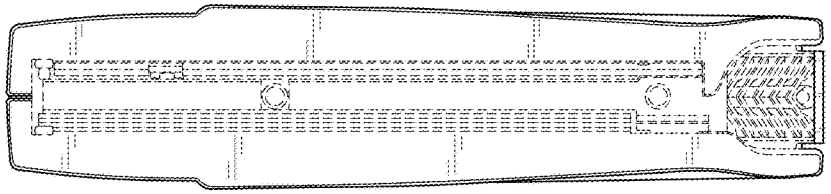

Matter enclosed in heavy brackets [ ] appears in the original patent but forms no part of this reissue; matter printed in italics indicates the additions made by reissue.

AMENDED

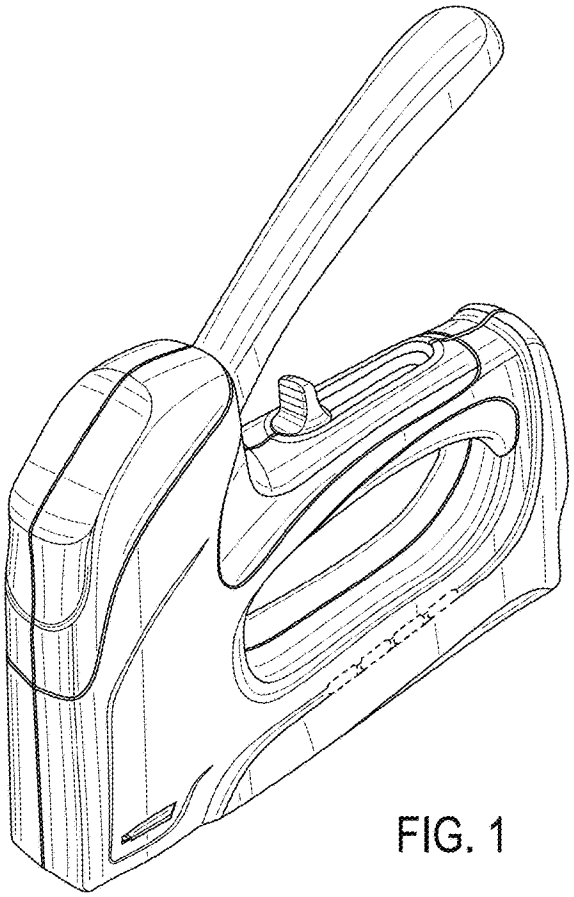
FIG. 1
AMENDED

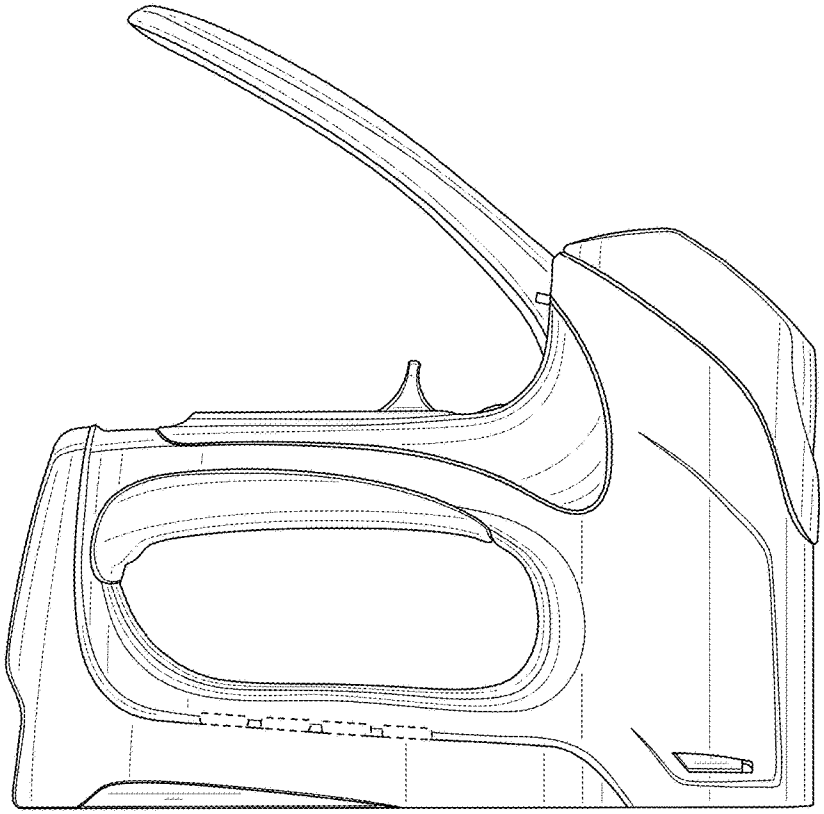
FIG. 2
AMENDED

Amended

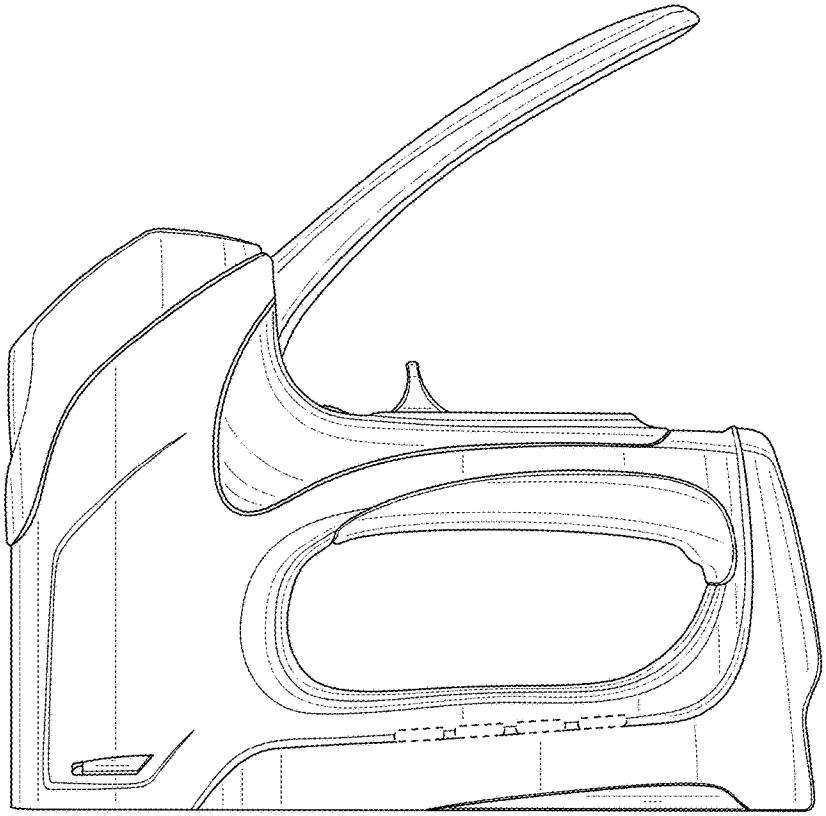
FIG. 4
AMENDED

Amended

Amended

Amended